United States Patent [19]
Uehara et al.

[11] Patent Number: 5,252,902
[45] Date of Patent: Oct. 12, 1993

[54] SERVO CONTROL SYSTEM

[75] Inventors: Shinichiro Uehara; Wataru Ichikawa; Manabu Takei, all of Tokyo, Japan

[73] Assignee: Kabushiki Kaisha SG, Tokyo, Japan

[21] Appl. No.: 663,747

[22] Filed: Mar. 1, 1990

[30] Foreign Application Priority Data

Mar. 2, 1990 [JP] Japan .................................. 2-49639

[51] Int. Cl.⁵ .............................................. G05B 19/29
[52] U.S. Cl. .................................... 318/599; 318/600; 388/811; 388/815
[58] Field of Search ................ 318/625, 34–35, 318/38–41, 111–113, 59, 560, 561, 567, 569, 590, 592–594, 599, 600–602, 675–677; 388/809–815, 933

[56] References Cited

U.S. PATENT DOCUMENTS

| | | | |
|---|---|---|---|
| 4,415,844 | 11/1983 | Mendenhall et al. | 318/254 |
| 4,675,582 | 6/1987 | Hommes et al. | 318/38 |
| 4,837,491 | 6/1989 | Fujioka et al. | 318/625 |
| 4,847,779 | 7/1989 | Masao et al. | 318/625 X |
| 4,853,602 | 8/1989 | Hommes et al. | 318/38 |
| 4,897,587 | 1/1990 | DiGiulio et al. | 318/625 |
| 5,013,989 | 5/1991 | Kurakake et al. | 318/625 |

Primary Examiner—William M. Shoop, Jr.
Assistant Examiner—David Martin
Attorney, Agent, or Firm—Graham & James

[57] ABSTRACT

There are provided a position and velocity control system for producing a velocity command signal in response to a position command signal and a signal representing a current position and velocity of a servo motor, a current control system for supplying a drive current to the servo motor in response to the velocity command signal, and a communication system for transmitting data between the two systems by means of a bilateral communication line. A servo control system is thereby separated between the current control system and the position and velocity control system and connected to each other through the communication system. This separation through the communication system is advantageous for protecting the position and velocity control system from influence of noise generated in the current control system and also brings about benefits such as expansion of the controllability owing to the bilateral communication, sharing of a single current control system by plural servo motors by switching connection of the servo motors and controllability of plural pairs of servo motor and current control system by a single position and velocity control system by a multi-point connection.

13 Claims, 8 Drawing Sheets

SERVO CONTROL SYSTEM

BACKGROUND OF THE INVENTION

This invention relates to a servo control system for controlling driving of a servo motor and, more particularly, to a servo control system of this type in which a servo driver is divided into a current control section and a position control section.

A servo motor is used for positioning of shafts in a numerical control device or a positioning device for controlling a machine tool or an automation device.

For controlling the servo motor, a conventional servo motor is provided with a servo driver of a rated output corresponding to the servo motor and a position control section for controlling this servo driver. In the following description, these servo driver and position control section will be called servo control means and a including the servo motor and the servo control means will be called a servo control system.

Figure 9:
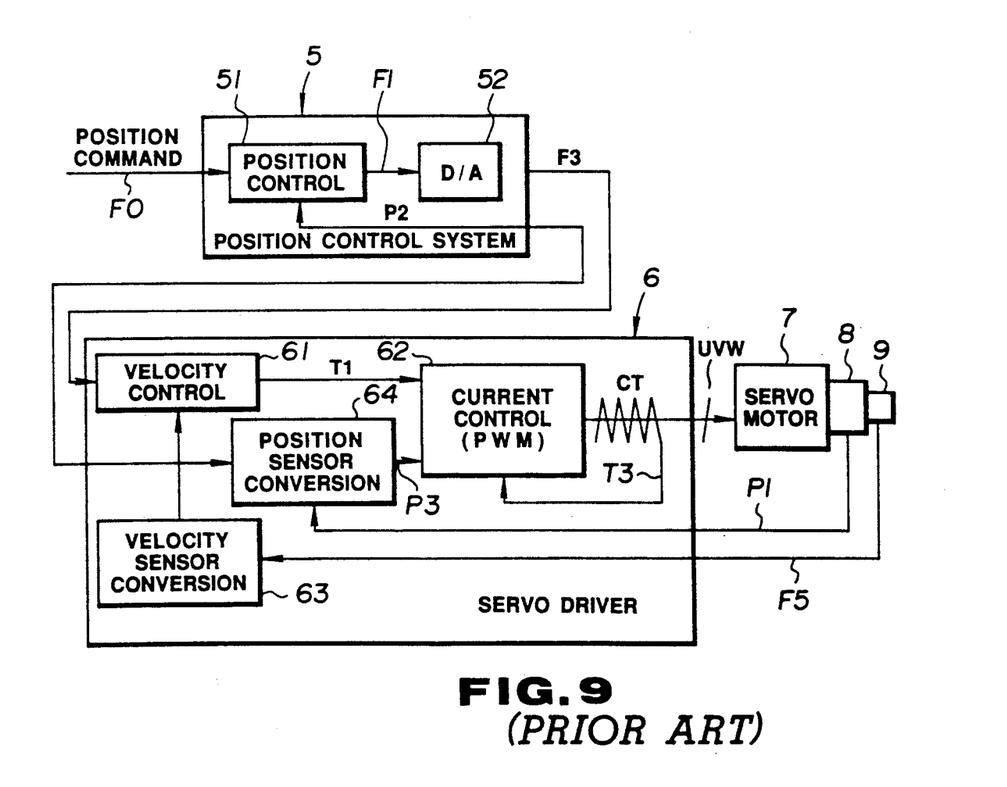
FIG. 9 is a block diagram showing an example of the prior art servo control system.

Referring to FIG. 9, a prior art servo control system will be described.

A servo motor 7 is, for example, an AC servo motor of an ac drive type. To the servo motor 7 is coupled a position sensor 8 for detecting a current position of the servo motor 7 and a velocity sensor (pulse generator) 9 for detecting a current velocity. Outputs P1 and P5 of these sensors are converted to position data P2 and velocity data F4 by a position sensor conversion circuit 64 and a velocity sensor conversion circuit (F/V converter) 63 and then supplied to a position control section 51 and a velocity control section 61. Further, in a case where a synchronizing type servo motor is used as the servo motor 7, the position sensor conversion circuit 64 provides to a current control section 62 a phase signal P3 for controlling switching position of a field magnetic system produced on the basis of the output P1 of the position sensor 8.

A position control system 5 comprises a position control section 51 and a D/A converter 52. The position control section 51 receives position command data F0 representing a target position of the servo motor 7 from an unillustrated high order controller and also receives the position data P2 representing the current position of the servo motor 7. The position control section 51 computes the difference between the position command data F0 and the position data P2 and provides a velocity command signal F1 corresponding to the position difference to the D/A converter 52. The D/A converter 52 converts the velocity command signal F1 from the position control section 51 to an analog velocity command signal F3 and supplies it to a servo driver 6.

The servo driver 6 comprises a velocity control section 61, a current control section 62, a velocity sensor conversion circuit 63 and a position sensor 64.

The velocity control section 61 receives the velocity command signal F3 from the D/A converter 52 and a velocity signal F4 representing a current velocity of the servo motor 7. The velocity control section 61 computes the difference between the velocity command signal F3 and the velocity signal F4 and supplies a torque signal (current command signal) T1 for the servo motor 7 corresponding to the velocity difference to the current control section 62.

The current control section 62 drives a power transistor by a three-phase PWM signal and thereby supplies a drive current of each phase (i.e., U phase, V phase and W phase) to the servo motor 7. At this time, current feedback signals T3 of the U phase and the V phase are fed back to the current control section 62 by a current detection isolator CT. The current control section 62 amplifies differences between the torque signals (current command signals) T1 of the respective phases and the feedback signals T3 of the respective phases and thereby supplies a drive current to the servo motor 7.

In the servo control system described above, the servo motor 7 must be provided with the servo driver 6 of a rated output corresponding to the servo motor 7 and, accordingly, when the servo motor 7 is replaced, the servo driver 6 must also be replaced in accordance with the output rated data of the servo motor 7. In this case, in a servo motor in which the position control system 5 is provided integrally with the servo driver 6, not only the servo driver 6 but also the position control system 5 must also be replaced.

Further, since the position control system 5 and the servo driver 6 are generally provided for each servo motor 7, an individual position control system 5 and an individual servo driver 6 are provided for a servo motor of each shaft even when it is unnecessary to control plural shafts (servo motors) simultaneously. This is a waste of costs and, besides, requires a large system.

These problems can be overcome by separating the position control system 5 from the servo driver 6.

In the above described servo control system, however, separation of the position control system 5 from the servo driver 6 can only be realized by detachably connecting them by means of detachable cables. This manner of separation, however, is not applicable to devices between which the number and size of cable connectors are incompatible and hence cannot be applied universally.

From the point of view of universal application, connection by a standardized communication line such as RS232C is preferable to connection by means of detachable cables. Since, however, such communication line is adapted to unilateral communication, it can supply a velocity command signal to the servo driver side only and necessary information on the servo driver side, e.g., rated data and disorder data, cannot be supplied to the position control system 5 and further to the high order controller side. Therefore, it is not possible for servo motors of different rated data to share the position control system 5 commonly or monitor the state of the servo motor and, accordingly, the benefits of separation of the position control system 5 and the servo driver 6 cannot be obtained. Mere separation therefore is not of much significance.

Moreover, even when the position control system 5 can be separated from the servo driver 6 (velocity control section 61), separation of them with a large distance therebetween is not preferable because it results in separation of similar control systems. On the other hand, while it is desirable to dispose the current control section 62 near the servo motor 7 since the current control section 62 controls a high voltage current compared with other control systems, positioning of the servo driver 6 having the velocity control section 61 near the device such as servo motor 7 tends to cause the velocity control section 61 to be adversely affected by noise. In the conventional system, therefore, the servo driver 6 and the servo motor 7 are provided with a suitable distance therebetween.

It is, therefore, not desirable for the construction of the conventional servo control system to separate the position control system 5 from the velocity control section 61 and dispose the servo driver 6 and the servo motor 7 with a too large distance therebetween.

SUMMARY OF THE INVENTION

It is, therefore, an object of the invention to provide a servo control system capable of separating a control system effectively and suitably at a suitable place in the servo control system.

The servo control system according to the invention comprises a servo motor, a current control section responsive to a velocity command signal for supplying a drive current to the servo motor, a position and velocity control section responsive to a position command signal and a signal representing a current position and velocity of the servo motor for supplying the velocity command signal to the current control section, and communication means provided between the current control section and the position control section for transmitting data between the current control section and the position and velocity control section by means of a bilateral communication line.

Since there is provided the communication means between the current control section and the position control section, the current control section and the position control section are separated from each other and connected to each other by means of the communication means. Accordingly, the current control section which controls a high voltage current can be disposed near the servo motor while the position and velocity control section having a position and velocity control system can be disposed with a certain distance to the servo motor, so that the position and velocity control section is not subject to noise generated by the current control section.

Since data transmission between the current control section and the position and velocity control section is performed through the bilateral communication line, control parameters for the current control section and other data can be read by a high order controller through the communication line. When, accordingly, the capacity of the servo motor has been changed, a servo motor of any rated data can be adapted for use simply by reading control parameters for the current control section and other data by the high order controller and modifying the data in accordance with the rated data of the servo motor.

Since the current control section is separated from the position control section, plural servo motors can be provided for a single current control section, so that drive control of these servo motors can be switched one from another by means of switching means.

Further, since the current control section is separated from the position control section, plural pairs of the current control sections and servo motors can be provided and the position and velocity control section and current control section can be connected in a multi-point connection, so that plural servo motors can be simultaneously controlled.

Preferred embodiments of the invention will be described with reference to the accompanying drawings.

BRIEF DESCRIPTION OF THE DRAWINGS

In the accompanying drawings.

DESCRIPTION OF PREFERRED EMBODIMENTS

Figure 1:
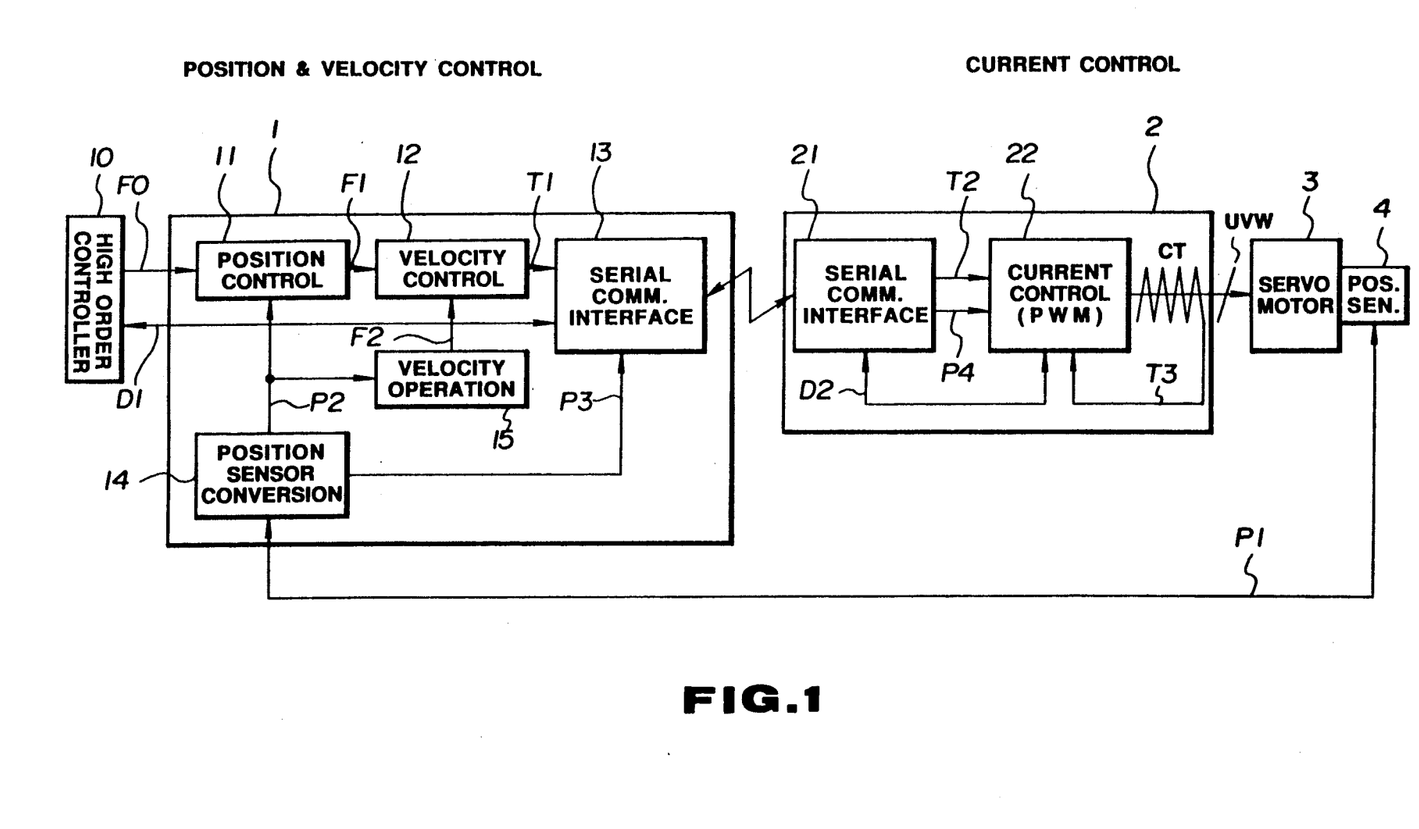
FIG. 1 is a block diagram schematically showing an embodiment of the servo control system according to the invention.

FIG. 1 is a diagram showing an embodiment of the servo control system of the invention.

A servo motor 3 is constructed, for example, of an AC servo motor of a synchronizing type. To the servo motor 3 is coupled a position sensor 4 for detecting the current position of the servo motor 3 in an absolute value. As the position sensor 4, induction type phase-shift type position sensors such as disclosed in U.S. Pat. No. 4,612,503, U.S. Pat. No. 4,604,575, U.S. Pat. No. 4,754,220 and U.S. Pat.No. 4,572,951 are used. Output P1 of the position sensor 4 is applied to a position sensor conversion circuit 14 and converted to digital position data P2.

A high order controller 10 is connected to a position control section 11 and supplies position command data F0 representing a target position of the servo motor 3 to the position control section 11. The high order controller 10 is connected to a serial communication interface 13 and produces various data D1.

The position and velocity control system 1 comprises the position control section 11, velocity control section 12, serial communication interface 13, position sensor conversion circuit 14 and velocity operation section 15.

The position control section 11 is connected to the high order controller 10 and the position sensor conversion circuit 14 and receives position command data F0 representing a target position of the servo motor 3 and position data P2 representing the current position of the servo motor 3.

The position control section 11 is connected to the velocity control section 12, computes difference between the position command data F0 and the position data P2 and supplies a velocity command signal F1 corresponding to the position difference. The position sensor conversion circuit 14 produces a phase signal P3 for controlling the switching position of field magnetic system on the basis of the output P1 of the position sensor 4 and supplies the phase signal P3 to the serial communication interface 13.

The velocity control section 12 is connected to the position control section 11, the velocity operation section 15 and the serial communication interface 13 and receives the velocity command signal F1 from the position control section 11 and the velocity signal F2 representing the current velocity of the servo motor 3. The velocity signal F2 is obtained by converting the position data P2 of the position sensor conversion circuit 14 by the velocity operation section 15. The velocity operation section 15 receives the position data P2 of the position sensor conversion circuit 14 and computes the velocity of the servo motor 3 by a digital operation on the basis of the amount of change in the position data P2 per predetermined unit time.

The velocity control section 12 is connected to the serial communication interface 13 and computes difference between the velocity command signal F1 and the velocity signal F2 and supplies a torque signal (current command signal) T1 of the servo motor 3 corresponding to the velocity difference to the serial communication interface 13.

The serial communication interface 13 is connected to the high order controller 10, velocity control section 12 and position sensor conversion circuit 14 and transmits the various data D1 from the high order controller 10, torque signal T1 and phase signal P3 to a serial communication interface 21 of a current control system 2 through a communication line. The serial communication interface 13 and the serial communication interface 21 are connected to each other by a bilateral communication line so that various data D1 from the high order controller 10 and data D2 generated in the current control system 2 are exchanged between the high order controller 10 and the current control system 2.

The current control system 2 comprises the serial communication interface 21 and a current control section 22.

The serial communication interface 21 is connected to the serial communication interface 13 of the position and velocity control system 1 and the current control section 22, receives the torque signal T1 and the phase signal P4 from the serial communication interface 13 and supplies them as a torque signal T2 and a phase signal P4 to the current control section 22, and transmits various data D2 including a status signal representing the control state in the current control section 22 to the serial communication interface 13.

The current control section 22 is connected to the serial communication interface 21 and the servo motor 3, receives the torque signal T2 and the phase signal P4, generates a PWM signal of three phases on the basis of these signals T2 and P4 and thereby drives a power transistor and supplies a drive current to the respective phases (U phase, V phase and W phase) of the servo motor 3. At this time, current feedback signals T3 of the U phase and V phase are fed back to the current control section 22 by a current detection isolator CT. The current control section 22 amplifies difference between the torque signal (current command signal) T2 of each phase and the current feedback signal T3 of each phase and thereby supplies a drive current to the servo motor 3.

The serial communication interface 21 and the current control section 22 are connected to each other by a data line so that various data can be exchanged between them.

The current control section 22 has a function of detecting the control state of the servo motor 3 including overload, power source voltage drop, overcurrent and overvoltage and overheat and has a memory storing various data including a servo status signal representing the control state, an ID code representing rated data of a current amplifier and a motor rated data code representing rated data of the servo motor to be controlled. The data stored in the memory of the current control section 22 is transmitted to the high order controller 10 through the data line and the serial communication interfaces 21 and 13. The motor rated data code is stored as a table in the memory. Accordingly, by selecting a table number corresponding to the rated data of the servo motor connected through the communication line, the current control section 22 can control a servo motor of a different rated data. Thus, even in a case where the servo motor has been replaced, the current control section can be changed to a control system corresponding to the servo motor by only changing the table number.

The operation of the above described embodiment will now be described.

Upon construction of the servo control system shown in FIG. 1, data D1 representing the table number indicating the rated data of the servo motor 3 is transmitted from the high order controller 10 to the serial communication interface 21 on the side of the current control section 2 through the serial communication interface 13. The table number data is then transmitted to the current control section 22 through the serial communication interface 21. The rated data of the servo motor 3 is identified by the current control section 22 and the current control section 22 functions as a current control section corresponding to the rated data of the servo motor 3.

The high order controller 10 supplies the position command data F0 representing the target position of the servo motor 3 to the position control section 11. The position control section 11 thereupon supplies the velocity command signal F1 based on the position command data F0 and the position data P2 to the velocity control section 12. The velocity control section 12 supplies the torque signal (current command signal) T1 corresponding to the velocity command signal F1 and the velocity signal F2 to the serial communication interface 13.

Data transmission is made between the serial communication interface 13 and the serial communication interface 21 and the torque signal T2 and the phase signal P4 are supplied from the serial communication interface 21 to the current control section 22. The current control section 22 controls the drive current of the servo motor 3 in response to the torque signal T2, current feedback signal T3 and phase signal P4. The output P1 of the position sensor 4 coupled to the servo motor 3 is fed back to the position and velocity control system 1. The servo control system repeats the above described operation to control rotation of the servo motor 3.

When a disorder such as overload, power source voltage drop, overcurrent, overvoltage or overheat has occurred during the servo motor control, data of the status signal representing the control state is transmitted from the current control section 22 to the serial communication interface 21. This data of the status signal is transmitted to the high order controller 10 through the serial communication interface 13. Responsive to the data of the status signal, the high order controller 10 performs a processing according to the type of the status signal.

In a case where the servo motor 3 is to be changed to a servo motor of different rated data, the current control section 22 can perform a current control corresponding to the servo motor after change by simply transmitting a table number representing the rated data of the servo motor after change to the current control section 22.

Figure 2:
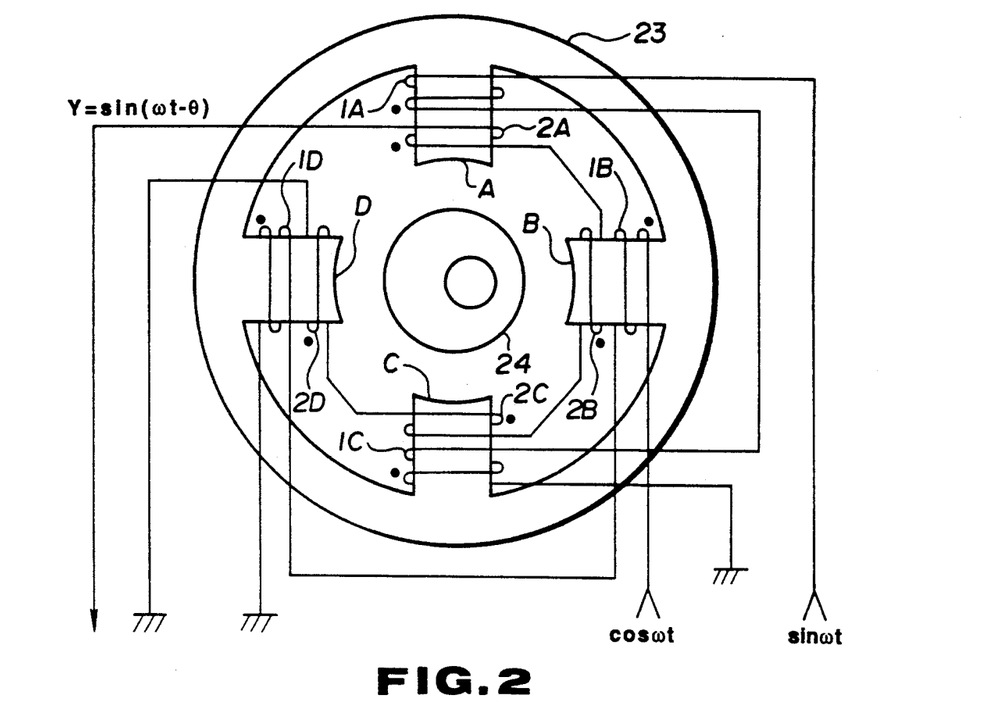
FIG. 2 is a cross-sectional view of an absolute type position sensor consisting of a phase-shift type position sensor of an induction type which is an example of the position sensor shown in FIG. 1.

FIG. 2 is a diagram showing an absolute type position sensor consisting of a phase-shift type position sensor of an induction type which is an example of the position sensor 4. Since details of this position sensor 4 are disclosed in the above mentioned United States patents, it will be described only briefly here.

The position sensor 4 includes a stator 23 in which plural poles A-D are provided with a predetermined interval (e.g., 90 degrees) in the circumferential direction and a rotor 24 inserted in a space of the stator 23 surrounded by the poles A-D.

The rotor 24 is made of a shape and material which causes reluctance of each of the poles A-D in accordance with the rotation angle. The rotor 24 is formed, for example, in an eccentric cylindrical configuration. Primary coils 1A-1D and secondary coils 2A-2D are wound on each of the poles A-D of the stator 23. The coils are wound in such a manner that the first pair of diametrically opposed poles A and C and the second pair of diametrically opposed poles B and D will operate differentially and differential reluctance change will be produced between these pairs.

The primary coils 1A and 1C wound on the first pair of poles A and C are excited by a sinusoidal wave signal sin $\omega t$ whereas the primary coils 1B and 1D of the second pair of poles B and D are excited by a cosine wave signal cos $\omega t$. As a result, a composite output signal Y is provided from the secondary coils 2A-2D. This composite output signal Y is a signal Y=sin ($\omega t-\theta$) which is phase-shifted by an electrical phase angle corresponding to the rotation angle $\theta$ of the rotor 24 with respect to the primary ac signal (i.e., the exciting signal for the primary coils) sin $\omega t$ or cos $\omega t$ which constitutes a reference signal.

Accordingly, when the above described phase-shift type position sensor of the induction type is employed, it is necessary to provide an ac signal generation circuit for generating the primary ac signal sin $\omega t$ or cos $\omega t$ and a phase difference measuring circuit for measuring the electrical phase difference $\theta$ of the composite output signal Y and thereby computing position data of the rotor. These primary ac signal generation circuit and the phase difference measuring circuit are provided in the position sensor conversion circuit 14.

Figure 3:
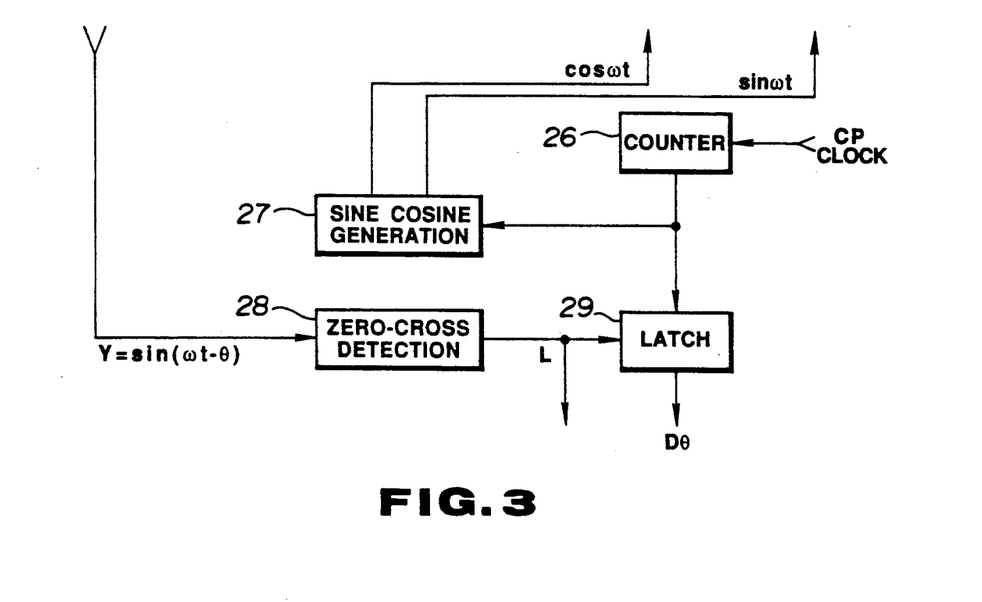
FIG. 3 is a block diagram showing an example of the position sensor conversion circuit of FIG. 1.

FIG. 3 shows an example of the position sensor conversion circuit 14 of FIG. 1. In the position sensor conversion circuit 14, a predetermined high rate clock pulse CP is counted by a counter 26 and a sinusoidal wave signal sin $\omega t$ and a cosine wave signal cos $\omega t$ are respectively generated by a sine cosine signal generation circuit 27 in response to the output of the counter 26. The outputs of the sine cosine signal generation circuit 27 are applied, as has been described before, to the primary coisl 1A-1D and the secondary coils 2A-2D.

The composite output signal Y=sin ($\omega t-\theta$) of the outputs from the secondary coils 2A-2D is supplied to a zero-cross detection circuit 28. The zero-cross detection circuit 28 produces a pulse L in synchronism with a timing at which the electrical phase angle of the composite output signal Y is zero. The pulse L is used as a latch pulse in a latch circuit 29. The latch circuit 29 therefore latches a count of the couter 26 in response to rising of the pulse L. The period in which the count of the counter 26 completes one circulation is synchronized with one period of the sinusoidal wave signal sin $\omega t$. Accordingly, a count corresponding to phase difference $\theta$ between the reference ac signal sin $\omega t$ and the composite output signal Y=sin ($\omega t-\theta$) is latched in the latch circuit 29. The latched value therefore is provided as digital position data D$\theta$. The latch pulse L may be also used suitably as a timing pulse.

A value representing an absolute position in one rotation of the servo motor among values latched by the latch circuit 29 is provided as digital phase data P3 and used for controlling switching position of the field magnetic system.

The composite output signal P1 of the phase-shift type position sensor as shown in FIG. 2 uses an absolute position of the servo motor as the phase difference of a signal and hence has the feature that it is not much affected by noise. Accordingly, in a case where, as shown in FIG. 1, the composite output signal P1 is fed back from the position sensor 4 to the position and velocity control system 1 without using a communication line, the composite output signal P1 may be directly fed back since there is no influence by noise. Alternatively, however, the composite output signal P1 may be fed back by using a communication line such as a serial communication interface.

The example of FIGS. 2 and 3 is a position sensor of a type which detects the range of one rotation in an absolute value. Alternatively, an absolute position may be detected over plural rotations by combining a plurality of such absolute type sensors.

Figure 4:
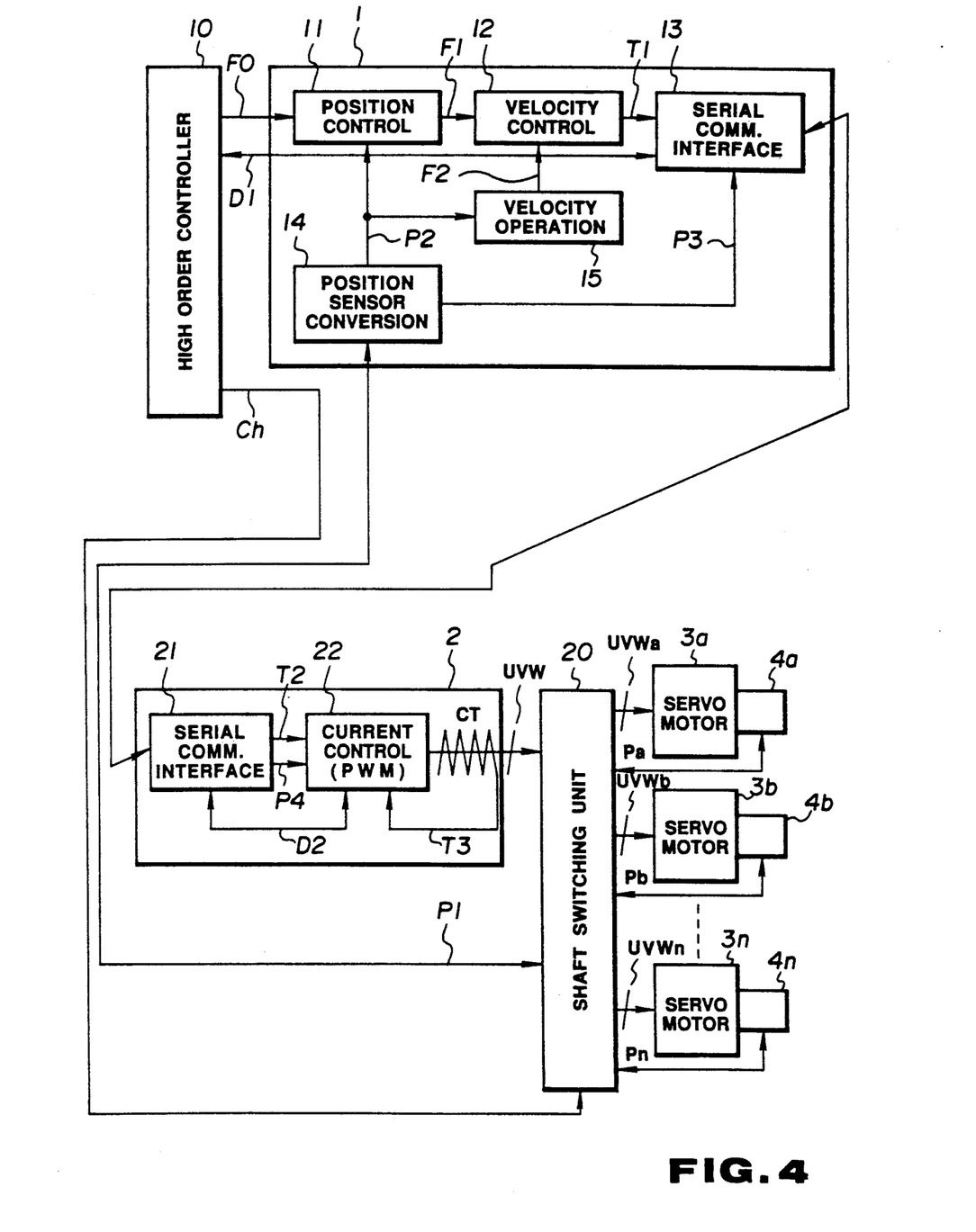
FIG. 4 is a block diagram showing an example in which plural servo motors are controlled by switching control by using the servo control system according to the invention.

FIG. 4 shows an embodiment in which plural servo motors are controlled by switching control thereof by using the servo control system according to the invention. In FIG. 4, the same component parts as those in FIG. 1 are designated by the same reference characters and description thereof will be omitted.

Difference between this embodiment and that of FIG. 1 is that, in this embodiment, plural servo motors 3a, 3b-3n are connected to a shaft switching unit 20 and a drive current of three phases (U phase, V phase and W phase) and a sinusoidal wave signal, cosine signal and composite output signal for the position sensor are switched alternately by the shaft switching unit 20.

The shaft switching unit 20 is connected to a current control section 22, a position sensor conversion circuit 14, a high order controller 10, servo motors 3a, 3b-3n and position sensors 4a, 4b-4n, and switches supply of the drive current to the servo motors 3a, 3b-3n and connection of the signal for the position sensors to the respective position sensors 4a, 4b-4n. In response to a shaft switching signal Ch from the high order controller 10, a pair of one of the servo motors 3a, 3b-3n and one of the position sensors 4a, 4b-4n is selectively connected to the position and velocity control system 1 and the current control system 2 to form a servo control loop in each system.

The shaft switching unit 20 has switch elements provided in correspondence to the respective servo motors 3a, 3b-3n and position sensors 4a, 4b-4n and, by selectively conducting switching elements only corresponding to a pair of servo motor and position sensor, the pair of servo motor and position sensor is selectively connected to the control loop.

In this case, if all rated data of the servo motors 3a, 3b-3n are the same, the switching control may be made while the table number representing the raded data of the servo motor remains constant. If rated data of the servo motors 3a, 3b-3n differ from one another, the table number indicating rated data of a specific servo motor is transmitted by means of the communication line before the specific servo motor is controlled and, by this arrangement, servo motors of different capacities can be controlled one after another by the switching control with only a single current control system 2.

Figure 5A:
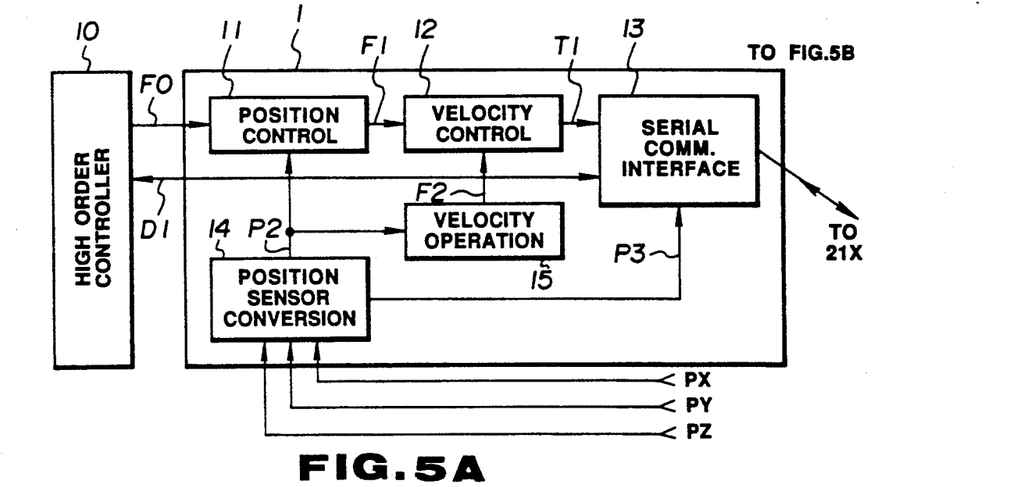
FIGS. 5A and 5B are block diagrams showing an embodiment in which plural servo motors are simultaneously controlled by using the servo control system according to the invention.
Figure 5B:
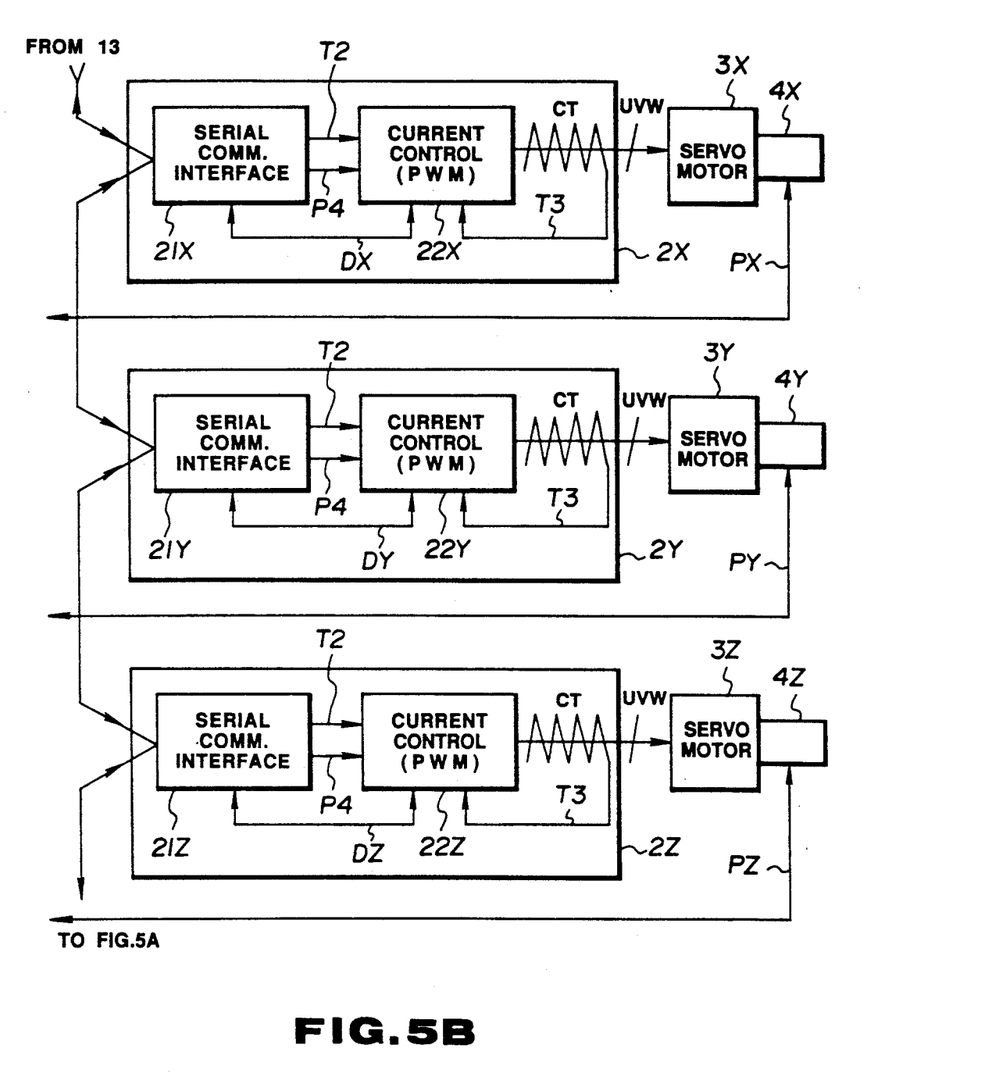

FIGS. 5A and 5B show an embodiment in which plural servo motors are simultaneously controlled by using the servo control system according to the invention. In FIGS. 5A and 5B, the same component parts are designated by the same reference characters and description thereof will be omitted.

Difference between this embodiment and that of FIG. 1 resides in that plural current control systems 2X, 2Y and 2Z for controlling a drive current for the servo motors are provided, these systems 2X, 2Y and 2Z are connected in a multi-point connection by a communication line thereby to connect servo motors 3X, 3Y and 3Z to the current control systems 2X, 2Y and 2Z. More specifically, in the present embodiment, plural pairs of servo motors, position sensors and current control systems are provided and serial communication interfaces 21X, 21Y and 21Z for them and the serial communication interface 13 of the position and velocity control system 1 are connected in a multi-point connection. Besides, as in the embodiments of FIGS. 1 and 4, outputs PX, PY and PZ of the position sensors 4X, 4Y and 4Z in this embodiment also are applied directly to the position sensor conversion circuit 14. In the position and velocity control system 1, the position control operation and the velocity control operation are performed for each shaft and the serial communication interface 13 transmits data of each shaft.

The torque signal T1, phase data P3 and various data D1 can be simultaneously transmitted from the serial communication interface 13 to the serial communication interfaces 21X, 21Y and 21Z of the respective current control systems and the servo motors 3X, 3Y and 3Z can thereby be controlled simultaneously. Each of the current control sections 22X, 22Y and 22Z judges whether the transmitted data is addressed to it or not and, when the transmitted data is addressed to it, reads the data and performs a control in accordance with the data. When, for example, the transmitted data is one for driving of the servo motor, a drive current is supplied to the servo motor on the basis of the data. When, for another example, the table number indicating raded data of the servo motor has been transmitted, the drive current of the current control section 22 is changed to the rated data of the servo motor in accordance with the table number.

By providing plural pairs of the servo motor and current control system as in the present embodiment and connecting them by a multi-point connection while the position and velocity control system is used in common, plural servo motors can be simultaneously controlled.

In the prior art servo control system as shown in FIG. 9, the response speed between the position control system 5 and the velocity control section 61 is in the order of several milliseconds whereas the response speed between the position control system 5 and the servo driver 6 is in the order of several ten microseconds. In other words, the response speed between the position control system 5 and the servo driver 6 may be much lower than the response speed between the velocity control section 61 and the current control section 62. It is therefore possible to separate the position control system 5 from the servo driver 6 and connect them by means of a communication line such as RS232 and thereby transmit the velocity command signal from the position control system 5 to the velocity control section 61.

Since, however, the communication line such as RS232C does not satisfy the response speed in the order of ten microseconds required for transmission between the velocity control section 61 and the current control section 62, it is not possible to apply the communication line such as RS232C to the serial communication interfaces 13 and 21 shown in FIG. 1.

Since the communication protocol such as RS232C is a system in which data of 7 or 8 bits is made to correspond to one character information, the following problems arise.

First, since the data form is based on the bit unit such as a binary number, there arises a case where data itself cannot be distinguished from the code (character) for communication control and, accordingly, bit permeability of data cannot be generally guaranteed.

Secondly, when the communication line of a serial communication is connected in a multi-point connection, a control code designating each station at each connecting point is required. Since bit permeability is not good as described above, the data section cannot be distinguished from the control code section.

Thirdly, since numerical value data only may be transmitted between the velocity control section 61 and the current control section 62, an inefficient processing of transmitting character information and converting it to numerical value data must be made.

On the other hand, a communication system represented by HDLC (High Level Data Link Control) quarantees bit permeability of data and has a station designation function, so that this communication system can be adopted as the communication system between the velocity control section 61 and the current control section 62.

Since, however, this HDLC must perform transmission and receiving of data and encoding and decoding of data by controlling consecutive "1" and flag sequence, a hardware for satisfying such function becomes complicated and expensive and, besides, a hardware for communication becomes too large and expensive to be used for the servo control system shown in FIG. 1.

The present embodiment, therefore, has adopted a new serial communication system which is constructed of a relatively uncostly and simple hardware and is capable of transmitting data at a high speed.

This serial communication system will be described below.

Figure 6A:
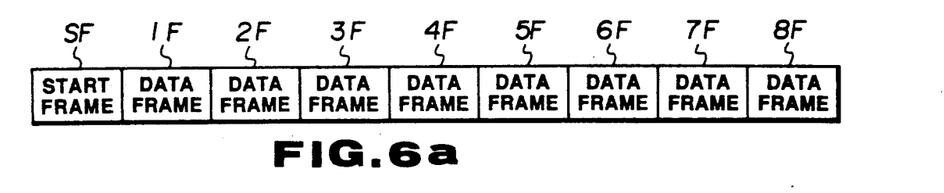
FIGS. 6a to 6d are diagrams schematically showing formats of transmitted data used for communication between the position and velocity control system and the current control system in FIG. 1.
Figure 6B:
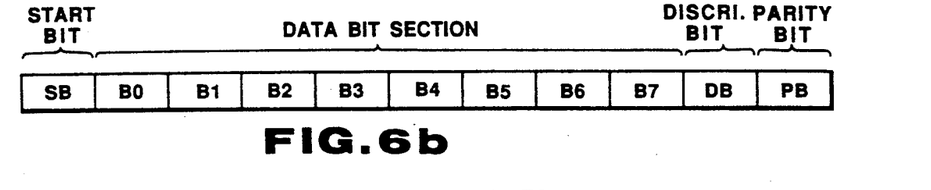
Figure 6C:
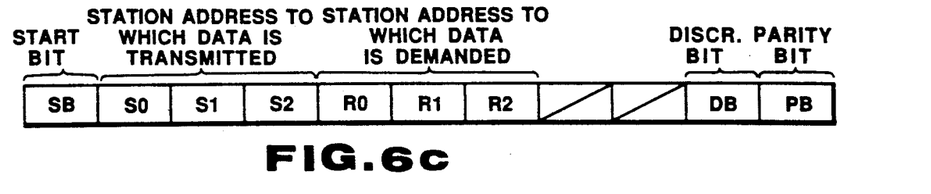
Figure 6D:
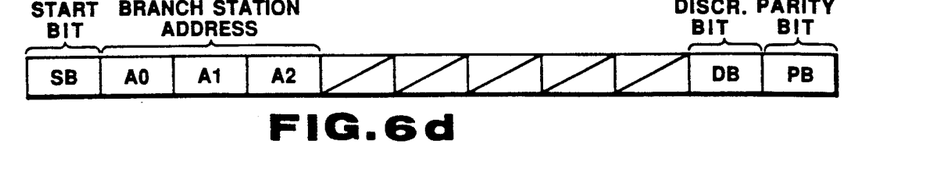

FIGS. 6a-6d schematically show data to be used in the communication system of the servo control system of this embodiment. FIG. 6a shows an order of transmitted frames. FIG. 6b shows structure of one unit of frame. FIG. 6c shows structure of a start frame SF which is transmitted from a main station. FIG. 6d shows structure of a start frame SF which is transmitted from a branch station.

The speed of data transmission in this embodiment is 2 Mbps (at clock frequency of 32 MHz), transmission format is NRZ and communication system is non-synchronized, all double mode.

Frames transmitted between a main station and a branch station by a single transmission includes one start frame SF and succeeding 8 data frames 1F to 8F. The following description will be made about a case where the length of data frames (data length) is 8 frames. In constructing a communication system, this data length is selectively adapted to a desired length, e.g., 2 frames, 4 frames, 8 frames or 16 frames, in accordance with the magnitude of the system by means of a microprocessor (CPU) or an external switch. Once the data length has been determined, the communication is conducted at this data length.

The start frame SF and data frame 1F to 8F consist respectively of 11 bits. The first one bit of the start frame SF and the data frames 1F-8F is a start bit SB indicating start of the frame. More specifically, a high level "1" is set as the start bit SB. Accordingly, a low level "0" is set between data and data, i.e., between data frame 8F and a start frame SF of next data.

Next to this start bit SB is provided a data bit section B0-B7 consisting of 8 bits. Bits indicating various data are set in the data bit section B0-B7. The following data is set in the data bit section B0-B7 of the start frame SF.

In the data bit section B0-B7 of the start frame SF, at least one station address is set. In a case where the main station transmits data to the branch station, bits S0, S1 and S2 indicating the station address to which data is to be transmitted are set at the first 3 bits B0, B1 and B2 of the data bit section B0-B7. In a case where the main station demands transmission of data from the branch station, bits R0, R1 and R2 indicating the station address to which data is to be transmitted are set at next 3 bits B3, B4 and B5. Conversely, in a case where the branch station transmits data to the main station, bits A0, A1 and A2 indicating the address of the branch station are set at the first 3 bits B0, B1 and B2. By transmitting such start frame SF between the main station and branch station, the main station and branch station can be connected by a multi-point connection.

Next to the data bit section B0-B7 is provided a discriminating bit DB consisting of one bit for discriminating the type of frame. More specifically, when the frame type is the start frame SF, a high level "1" is set whereas when the frame type is the data frame 1F-8F, a low level "0" is set. Accordingly, by discriminating this discriminating bit on the receiving side, whether the frame type is the start frame SF or the data frame 1F-8F can be discriminated.

Next to the discriminating bit DB is provided a parity bit PB consisting of one bit. A high level "1" is set at this parity bit PB when the number of high level "1" of the data bit section B0-B7 is even.

Although not illustrated, an idle signal of one or 2 frame length can be inserted before the start frame SF. This idle signal is a signal in which the high level "1" and the low level "0" are repeated alternately and malfunction of the communication line is detected on the receiving side depending upon whether the pattern of this idle signal has been received in a normal state or not. When the transmission format is NRZ, such idle signal is an accurate square wave of duty 50 percent. When an abnormal state such as disconnection, short-circuiting and mixing of noise has occurred, deformation in the waveform of the idle signal occurs, so that the abnormal state in the communication line can be detected by detecting such deformation by a hardware device.

Figure 7A:
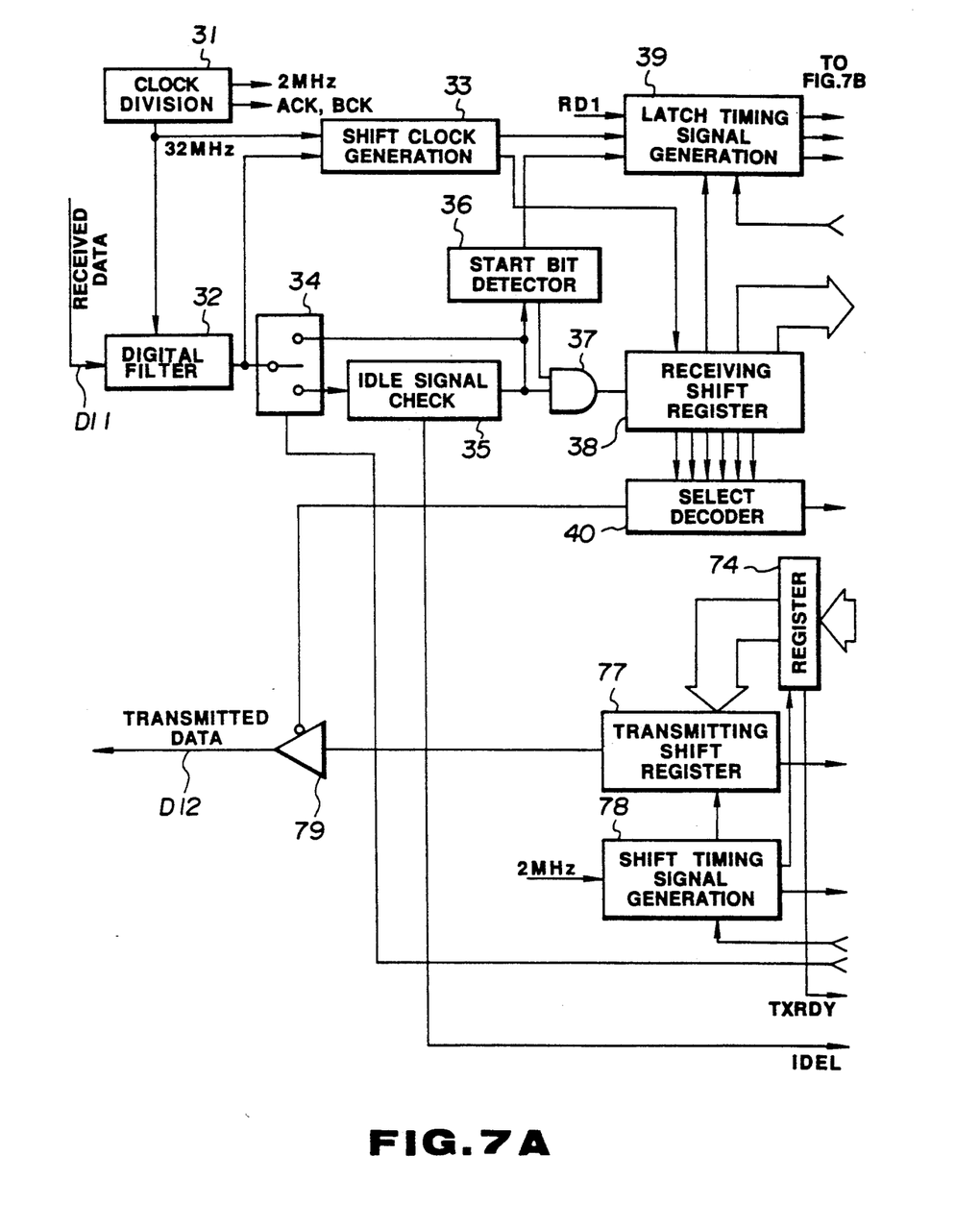
FIGS. 7A and 7B are block diagrams showing an example of the serial communication interface of FIG. 1.
Figure 7B:
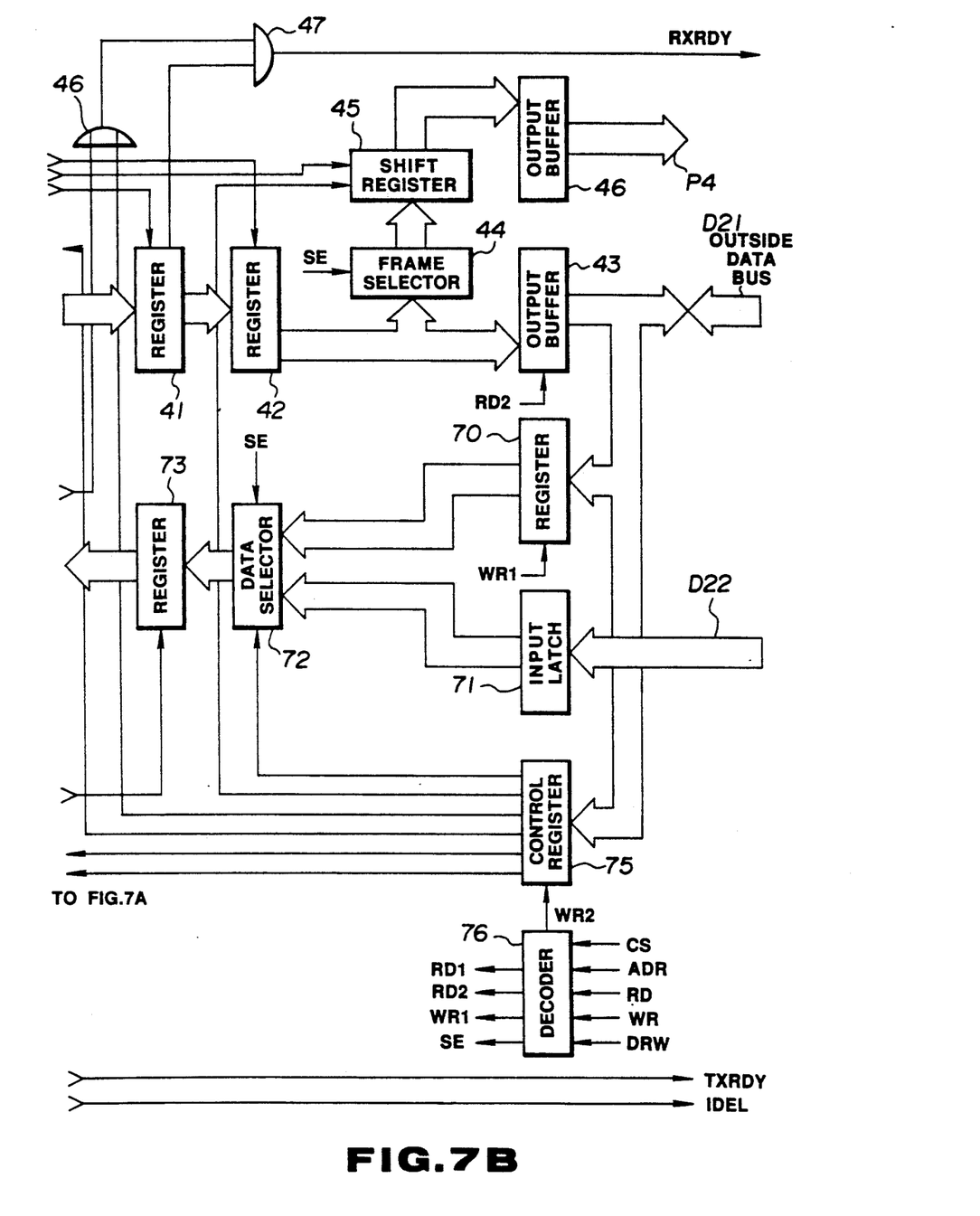

FIGS. 7A and 7B show an example of the serial communication interfaces 13 and 21 of FIG. 1.

A clock frequency divider 31 receives a clock of 32 MHz and produces a clock of 32 MHz, a phase-inverted clock of 32 MHz, a clock of 2 MHz for driving logics in the serial communication interface, and clocks ACK and BCK of predetermined frequencies.

A digital filter 32 is connected to the clock frequency divider 31, a shift clock generation circuit 33 and a select switch 34. The digital filter 32 receives the clock of 32 MHz and receiving data D11 (constituting data D1) constructed of the frames of FIG. 6 and provides them to the shift clock generation circuit 33 and the select switch 34 after correcting deformation in the pulse.

The shift clock generation circuit 33 is connected to the clock frequency divider 31, the digital filter 32, a receiving shift register 38 and a latch timing signal generation circuit 39. The shift clock generation circuit 33 receives the 32 MHz clock and received data D1 which has been corrected by the digital filter 32 and provides a clock for shifting a register to the receiving shift register 38 and the latch timing signal generation circuit 39.

The select switch 34 is connected to the digital filter 32, an idle signal check circuit 35, a start bit detector 36, an AND gate 37 and a control register 75. The select switch 34 selectively switches whether the received data D1 which has been corrected by the digital filter 32 should be supplied to the idle signal check circuit 35 in response to an output of the control register 75 or supplied directly to the start bit detector 36 and the AND gate 37.

The idle signal check circuit 35 is connected to the select switch 34, start bit detector 36 and AND gate 37. The idle signal check circuit 35 checks whether the idle signal which has been inserted before the received data D1 has been received normally or not and supplies a result of checking to the outside of the serial communication interface (the high order controller 10 or the current control section 22) as an idle check result signal IDEL and also supplies the received data D1 to the start bit detector 36 and AND gate 37. Whether the communication line is normal or not can be judged by this idle check result signal IDEL.

The start bit detector 36 is connected to the select switch 34, idle signal check circuit 35, AND gate 37 and latch timing signal generation circuit 39. The start bit detector 36 receives the received data D1 either from the select switch 34 or idle check circuit 35, detects start bit SB which is located at the beginning of each frame SF, 1F-8F constituting the data and, at the time when the start bit SB has been detected, resets a built-in counter and, during counting the number corresponding to the data bit section B0-B7 succeeding the start bit SB, discriminating bit DB and parity bit PB (10 in the present embodiment), supplies a high level "1" to the AND gate 37.

The AND gate 37 is connected to the select switch 34, idle signal check circuit 35, start bit detector 36 and receiving shift register 38 and supplies the received data D1 from the select switch 34 or the idle signal check circuit 35 to the receiving shift register 38 during generation of the high level "1" from the start bit detector 36.

In other words, 10 bit data corresponding to the data bit section B0-B7, discriminating bit DB and parity bit PB among frames SF, 1F–8F of the received data D1 is supplied to the receiving shift register 38 by the start bit detector 36 and the AND gate 37.

The receiving shift register 38 is connected to the shift clock generation circuit 33 and the AND gate 37 and stores data of 10 bits from the AND gate 37 in response to the clock from the shift clock generation circuit 33. The receiving shift register 38 is connected also to a latah timing signal generation circuit 39 to provide data of the discriminating bit DB of the frames SF, 1F–8F. Further, the receiving shift register 38 is connected to a register 41 through a bus of 8 bits to provide data of the data bit section B0–B7 in parallel. In a case where the serial communication interface is provided in a branch station, the receiving shift register 38 is connected to a select decoder 40 and provides data of the data bit section B0–B5 of a frame, i.e., data of address S0, S1 of the station to which data is to be transmitted and address R0, R1 and R2 from which transmission is demanded.

Although not illustrated, a decoder for parity check is connected to the receiving shift register 38 to conduct parity check of received data D11.

The latch timing signal generation circuit 39 is connected to the shift clock generation circuit 33, start bit detector 36, receiving shift register 38 and register 41. The latch timing signal generation circuit 39 detects whether the received data D11 stored in the receiving shift register 38 is the start frame SF or the data frame F1–F8 in accordance with the discriminating bit DB and stores the received data D11 at a position in the register 41 corresponding to the order number of the frame.

The latch timing signal generation circuit 39 is connected also to registers 41 and 42 and a shift register 45 to provide a timing signal for forwarding the received data D11. The latch timing signal generation circuit 39 is connected also to a control register 75 so that the frame structure of FIG. 6 (i.e., the number of data frame) can be set as desired in accordance with the value of the control register 75. In the present embodiment, description is made about a case where the data frame consists of 8 frames. In a case where the data frame consists of 4 frames, this change in the data frame can be coped with by changing only the set value of the control register 75.

The register 41 is connected to the receiving shift register 38, latch timing signal generation circuit 39, AND gate 47 and register 42 and receives and stores, in parallel, data of the data bit section B0–B7 of each frame from the receiving shift register 38 in response to the timing pulse from the latch timing signal generation circuit 39. The register 41 is connected to the AND gate 47 and supplies, upon completion of storing of the data, a high level "1" to the AND gate 47. When, therefore, the other input of the AND gate 47 is a high level "1", a read enable signal RXRDY representing completion of storing of the data is delivered out (to the high controller 10 or the current control section 22). The data of the register 41 is forwarded to the register 42 to bring about a read enable state. The register 41 has a capacity which is sufficient for storing data of 10 frames (8 × 10 bits) for the data bit section B0–B7 which is one frame more than the frames SF and F1–8F. This is an arrangement for bringing a total of the start frame SF and the data frames 1F–8F to an even number.

The register 42 has the same capacity as the register 41 (i.e., 8 × 10 bits) and is connected to the register 41, latch timing signal generation circuit 39, output buffer 43 and frame selector 44. The register 42 stores all data in the register 41 in response to the timing pulse from the latch timing signal generation circuit 39 and supplies this data to the frame selector 44 and the output buffer 43 simultaneously.

The output buffer 43 has the same capacity as the register 41 (8 × 10 bits) and is connected to the register 41 and the decoder 76. The output buffer 43 delivers out data of the frame among the frames 1F–8F corresponding to the address designated by the decoder 76 through a data bus D21.

The frame selector 44 is connected to the register 42, shift register 45 and decoder 76 and supplies selectively to the shift register 45 data for desired 2 frames among the frames 1F–8F produced successively from the register 42 in response to a frame selection signal SE.

The shift register 45 has a capacity which is sufficient for storing data for 2 frames (8 × 2 bits) and is connected to the latch timing signal generation circuit 39, frame selector 44, output buffer 46 and control register 75. The shift register 45 stores the data of desired 2 frames which has been selected by the selector 44 in response to the timing signal, shifts the stored data by a predetermined amount and supplies it to the output buffer 46.

The shift register 45 is a register for outputting the phase signal P4 of FIG. 1 in accordance with the number of poles of the servo motor. The phase signal P3 which the position sensor conversion circuit 14 normally outputs is a signal produced when the number of poles is 2. When the number of poles of the servo motor 3 is 4, 6 or 8, a phase signal P4 corresponding to the number of poles must be generated. The shift register 45, therefore, must generate a phase signal for 4 poles, 6 poles or 8 poles on the basis of the phase signal P3 provided by the position sensor conversion circuit 14 of FIG. 1. Accordingly, the shift register 45 takes out a frame having a phase signal from among the output data of the register 42 and shifts this data to generate a phase signal for 4 poles, 6 poles or 8 poles. When the servo motor 3 has 2 poles, data need not be shifted but may be output directly through the output buffer 46.

The output buffer 46 is connected to the shift register 45, converts data in the shift register 45 to the phase signal P4 of a fixed level and supplies it to the current control section 22.

Description has been made above about processing of received data. In a case where the communication line is connected in a multi-point connection as shown in FIG. 5, a station select decoder 40, an OR gate 46, an AND gate 47 and a transmitting output buffer 79 are required on the branch station side. Description will now be made about these circuits.

The station select decoder 40 is connected to the receiving shift register 38, transmitting output buffer 79 and OR gate 46. When data of address S0, S1 and S2 of a station to which data is to be transmitted which is stored in the receiving shift register 38 represents the address of its own station, the station select decoder 40 provides a high level "1" to the OR gate 46 and otherwise provides a low level "0" to the OR gate 46. The OR gate 46 receives the outputs of the station select decoder 40 and the control register 75 and provides a logical sum signal to the AND gate 47. Therefore, only when the data of the address S0, S1 and S2 stored in the receiving shift register 38 represents the address of its own station and storing of data in the register 41 has been completed, the AND gate 47 produces the read enable signal RXRDY. The current control section 22, therefore, can read out the data as data to its own station. Otherwise, the AND gate 47 does not produce the read enable signal RXRDY.

At this time, if a high level "1" is not supplied from the control register 75 to the OR gate 46, received data will be read by the current control section 22 regardless of output from the station select decoder 40. That is, in a case where plural current control systems 2 are connected in a multi-point connection and the same data should be transmitted to all current control sections 22 simultaneously, the control register 75 may be set so that a high level "1" will be supplied to the OR gate 46.

When the address R0, R1 and R2 of a station from which transmission of data is demanded is one of its own station, the station select decoder 40 provides a low level "0" to the transmitting output buffer 79 and otherwise provides a high level "1". Accordingly, the serial communication interface provides data only when the address R0, R1 and R2 of a station from which transmission of data is demanded is its own station and otherwise does not provides data. In a case where the receiving side is a main station, such control is unnecessary and all transmitted data may be loaded.

Description will now be made about a case where data is transmitted.

A register 70 is connected to an outside data bus D21, data selector 72 and decoder 76, stores data transmitted through the outside data bus D21 in response to a write signal WR1 from the decoder 76 and supplies it to the data selector 72.

An input latch 71 has a capacity which is sufficient for storing data for 2 frames (8×2 bits) and is connected to the outside data bus D22 and data selector 72. The input latch 71 stores data including the ID code representing rating of the current amplifier and rated code of the motor which are stored in the memory area of the current control section 22 and supplies the data to the data selector 72.

The data selector 72 is connected to the register 70, input latch 71, register 73, control register 75 and decoder 76 and, responsive to the frame selection signal SE from the decoder 76, selectively inserts data for 2 frames among the frames 1F-8F which are successively provided from the register 70 and supplies the data to the register 73.

The register 73 is connected to the shift timing signal generation circuit 78, data selector 72 and register 74, stores data from the data selector 72 in response to the timing signal and supplies it to the register 74 of a next stage. The register 73 has a capacity which is sufficient for storing data for 10 frames (8×10 bits) for the data bit section B0-B7 which is one frame more than the frames SF, 1F-8F.

The register 74 has the same capacity as the register 73 (8×10 bits) and is connected to the register 73, shift timing signal generation circuit 78 and transmitting shift register 77. The register 74 stores all data in the register 41 in response to the timing pulse from the shift timing signal generation circuit 78. Upon completion of data, a transmission enable signal TXRDY is supplied to the current control section 22. The current control section 32 therefore transmits data of the register 74 to the transmitting shift register 77 to bring about a transmission enable state.

The transmitting shift register 77 is connected to the register 74, shift timing signal generation circuit 78 and transmitting output buffer 79, stores data of the register 74 and serially supplies the data to the transmitting output buffer 79.

The transmitting output buffer 79 is connected to the transmitting shift register 77 and the station select decoder 40 and, upon receiving a low level "0" from the station select decoder 40, provides the data supplied serially from the transmitting shift register 77 as transmitted data D12.

The control register 75 is connected to the outside data bus D21, select switch 34, latch timing signal generation circuit 39, OR gate 46, shift register 45, data selector 72 and shift timing signal generation circuit 78. The control register 75 receives various control signals from the outside data bus D21 and provides these control signals to the respective devices for defining presence or absence of the idle signal, the number of frames to be transmitted etc.

The decoder 76 receives from the current control section 22 various signals such as a chip select signal CS, an address signal ADR, a read signal RD, a write signal WR and a data read and write signal DRW and supplies signals such as read signals RD1 and RD2, write signals WR1 and WR2 and a frame selection signal SE to the respective devices.

The operation of the serial communication system will now be described.

First, upon receipt of data of the frame structure of FIG. 6, the serial communication interface causes the data to pass through the digital filter 32 as received data D11 and thereby corrects pulse deformation of the received data D11.

The corrected received data D11 is caused by the select switch 34 to pass through the idle signal check circuit 35 or to be supplied directly to the AND gate 37 and start bit detector 36. Accordingly, data of the bit section B0-B7, discriminating bit DB and parity bit PB succeeding the start bit SB of each frame only is stored in the receiving shift register 38.

When the received data D11 stored in the receiving shift register 38 is the start frame SF, the station select decoder 40 judges whether the data is one transmitted to its own station or one demanding its own station to transmit data in accordance with the data bit section B0-B5 (address S0, S1 and S2 of a station to which data is to be transmitted and address R0, R1 and R2 from which data is demanded to be transmitted).

When there is data which has been transmitted to its own station and all frames of the received data have been stored in the register 41, the AND gate 47 produces the read enable signal RXRDY, so that the received data D11 is loaded in the current control section 22 through the registers 41 and 42, output buffer 43 and outside data bus D12.

When a phase signal is included in the received data D11 and the number of poles must be changed, the phase signal P4 for a predetermined pole number is provided through the frame selector 44, shift register 45 and output buffer 46.

Transmission of data will now be described.

The transmitted data is stored in the shift register 77 through the outside data bus D21, data selector 72 and registers 73 and 74. In a case where data stored in the memory area of the current control section 22 is simultaneously transmitted at this time, data of the memory area is inserted in a suitable portion of the transmitted data by the data selector switch 72.

The register 74 supplies the transmission enable signal TXRDY to the current control section 22 when storing of the transmitted data has been completed, so that transmitted data D12 is provided from the transmission shift register 77 in response to the transmission enable signal TXRDY. Unless, however, the address R0, R1 and R2 from which transmission of the received data D11 stored in the receiving frame 38 has been demanded concerns demand of transmission to its own station, the transmitted data D12 is not provided by the transmission output buffer 79.

By adopting the above described communication system in which one unit consists of the start bit of one bit, data bit a predetermined number of bits, discriminating bit of one bit and parity bit of one bit and the receiving side detects the start bit, which bit counting from the start bit is the data bit, discriminating bit or parity bit can be readily identified.

Since a predetermined number of frames of such structure is transmitted, at least one station address is set at the data bit of the first frame and this is made the start frame and data frame in which various data are set in the data bit is added to the start frame, whether the transmitted data is data for its own station or not can be readily judged.

Since, further, the structure of transmitted data is simple, time required for transmission, i.e., transmission speed, can be remarkably improved and, as a result, high speed transmission of data between the velocity control section and the current control section which has been considered impossible in the prior art servo control system can be realized whereby the interface for data transmission can be realized with a relatively cheap and simple hardware.

Figure 8:
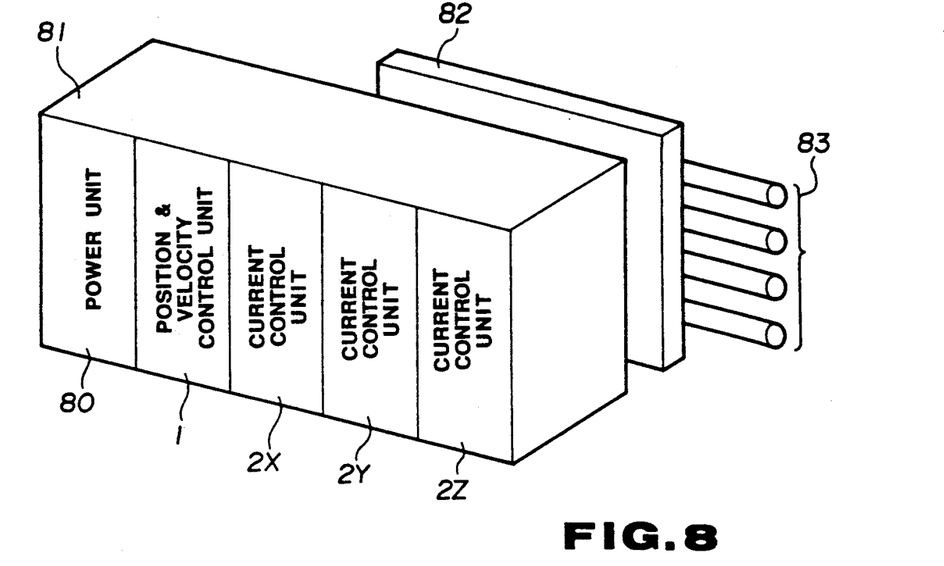
FIG. 8 is a diagram showing an appearance of the servo control system of FIGS. 5A and 5B received in a rack.

FIG. 8 shows an appearance of the servo control system of FIG. 5 received in a rack. A power unit 80 supplies power to the position and velocity control unit 1 and the current control units 2X, 2Y and 2Z. Since the current control units 2X, 2Y and 2Z have an inverter circuit for supplying current to the servo motor, these units 2X, 2Y and 2Z generate considerable heat as compared with the power unit 80 and the position and velocity control unit 1. In the present embodiment, therefore, the current control units 2X, 2Y and 2Z are arranged side by side in the rack 81 and a heat absorbing plate 82 is attached on the back surfaces of these units which generate heat. A heat pipe 83 is coupled to this heat absorbing plate 82 and heat generated in the current control units 2X, 2Y and 2Z is conducted through this heat pipe 83 to the heat radiating section provided outside of the rack 81. In other words, in the present embodiment, the current control units 2X, 2Y and 2Z which generate a large amount of heat are disposed side by side and heat generated by each unit is radiated outside through the common heat radiating device (heat absorbing plate 82 and heat pipe 83). The heat absorbing plate 82 may be constructed of a fin so that heat may be radiated directly to the air.

In the prior art device of FIG. 9, the servo driver cannot be disposed near the servo motor because the servo driver includes a velocity control loop therein. Since, according to the invention, the velocity and position control system is separated from the current control system, the current control system can incorporate a servo motor and they may be integrally constructed. In this case, rating of the current control system and rating of the servo motor have a relation of one to one, so that, when the servo motor is replaced, the current control system and the servo motor may be replaced as an integral device.

The servo motor is not limited to a synchronizing type servo motor but it may be an induction type ac servo motor. In the latter case, generation of the phase signal P3 is not necessary. Alternatively, a dc servo motor or any other type of servo motor may be used as the servo motor of the present invention. As for the position sensor, it is not limited to an induction type phase-shift type sensor but other type of sensors including an optical type absolute encoder and an incremental encoder may also be used.

The communication line is not limited to an electric cable but an optical cable may also be used.

According to the invention, data transmission between the current control means and the position control means is made by using a bilateral communication line and, accordingly, a servo motor of a different capacity may be used without changing the control system and replacement of a servo driver and other devices becomes unnecessary in replacing a servo motor. Further, by separating the position and velocity control system from the current control system, the current control system can be disposed near the servo motor and the position control means having a velocity control system may be disposed with a certain distance relative to the servo motor, so that the position control means is free from the influence of noise and a servo control system of an optimum construction can thereby be realized.

What is claimed is:

1. A servo control system comprising:
    a servo motor;
    current control means responsive to a velocity command signal for supplying a drive current to said servo motor;
    position and velocity control means, physically separated from said current control means, responsive to a position command signal and a signal representing a current position and velocity of said servo motor for supplying the velocity command signal to the current control means; and
    communication means provided between said current control means and said position and velocity control means for transmitting data between said current control means and said position and velocity control means by means of a bidirectional data communication line, said communication means including a first bidirectional communication interface provided in said position and velocity control means and a second bidirectional communication interface provided in said current control means.

2. A servo control system as defined in claim 1 further comprising a high order controller which supplies the position command signal representing the target position of said servo motor to said position and velocity control means,
    said high order controller transmitting data representing rated data of said servo motor to said current control means, and said current control means transmitting to said high order controller various data including a status signal representing a control state of said current control means, an ID code representing a current amplifier and a motor raded code representing rated data of a servo motor to be controlled.

3. A servo control system as defined in claim 2 wherein a plurality of said servo motors are provided and which further comprises switching means for selectively switching a servo motor to be driven by said current control means from among said servo motors in response to a switching signal from said high order controller.

4. A servo control system as defined in claim 1 wherein plural pairs of said servo motor and said current control means are provided and these plural pairs and said position and velocity control means are connected to each other by a multi-point connection by means of said communication means.

5. A servo control system as defined in claim 4 wherein said plural current control means are disposed adjacent to each other in a rack and heat radiation means is provided in common for each heat generating part of said current control means for radiating heat generated from said heat generating part to the outside.

6. A servo control system as defined in claim 1 wherein data transmission between said current control means and said position and velocity control means is made by using serial data composed of a start frame and a predetermined number of data frames added to the start frame in which each frame consists of
- a start bit of one bit indicating start of a frame,
- a data bit consisting of a predetermined number of bits provided next to the start bit,
- a discriminating bit of one bit provided next to the data bit for discriminating the type of a next frame, and
- a parity bit provided next to the discriminating bit, said start frame is a frame in which at least one station address is set in said data bit and said data frame is a frame in which various data are set in the data bit.

7. A servo control system as defined in claim 6 wherein said current control means and said position and velocity control means comprise a serial communication interface for receiving and outputting the serial data consisting of the start frame and the data frame and extracting and outputting the data bit only from the received serial data.

8. A servo control system as defined in claim 7 wherein said serial communication interface comprises:
- start bit detection means for detecting the start bit from among bits constituting said start frame and said data frame;
- a first register connected to said start bit detection means for storing, in response to a detection signal provided by said start bit detection means, only said data bit, said discriminating bit and said parity bit among said serial data;
- a second register connected to said first register for storing only the data bit stored in said first register;
- timing signal generation means connected to said first and second registers for storing, in response to said discriminating bit stored in said first register, said data bit in a predetermined position of said second register; and
- a first output buffer connected to said second register for delivering out said data bit.

9. A servo control system as defined claim 8 wherein said serial communication interface further comprises:
- a third register connected between said second register and said output buffer for storing said data bit stored in said second register and forwarding it to said output buffer;
- a fourth register connected to said third register for storing a data bit corresponding to a predetermined frame number among said data bit forwarded from said third register to said output buffer and shifting said stored data by a predetermined amount; and
- a second buffer connected to said fourth register for supplying said data bit as a phase signal to said current control means.

10. A servo control system as defined in claim 7 wherein said serial communication interface further comprises a station select decoder connected to said first register for controlling, in response to a station address in said data bit stored in said first register, output of said data bit stored in said second register and transmission of said serial data.

11. A servo control system as defined in claim 1 in which said current control means is integrally incorporated in said servo motor.

12. A servo control system; comprising:
- a servo motor;
- current control means responsive to a velocity command signal for supplying a drive current to said servo motor;
- position and velocity control means, physically separated from said current control means, responsive to a position command signal and a signal representing a current position and velocity of said servo motor for supplying the velocity command signal to the current control means, comprising an absolute type and phase-shift type position sensor for detecting a current position and velocity of said servo motor including a coil winding section and a member which displaces relative to said coil winding section to change reluctance in said coil winding section in accordance with the relative position of said member with respect to said coil winding section, said coil winding section being excited by primary ac signals which are phase-shifted to one another to generate an output ac signal having an electrical phase difference corresponding to the absolute position of said servo motor; and
- communication means provided between said current control means and said position and velocity control means for transmitting data between said current control means and said position and velocity means by means of a bidirectional data communication line.

13. A servo control system as defined in claim 12 wherein the output ac signal from said phase-shift type position sensor is directly fed back to said position and velocity control means without being transmitted through said communication line.

* * * * *